United States Patent
Yates et al.

[19]

[11] Patent Number: 5,950,317
[45] Date of Patent: Sep. 14, 1999

[54] WIRE GUARD ASSEMBLY FOR A STRING TRIMMER

[75] Inventors: Jan B. Yates, Reynoldsburg; Michael Krull, Hilliard; James Lind; Gregory A. Trees, both of Columbus, all of Ohio

[73] Assignee: McCulloch Corporation, Tuscon, Ariz.

[21] Appl. No.: 08/899,344

[22] Filed: Jul. 23, 1997

[51] Int. Cl.[6] ................................. A01G 3/06
[52] U.S. Cl. .................. 30/276; 30/296.1; 172/13
[58] Field of Search ............... 30/276, 286, DIG. 5, 30/287, 296.1; 172/13; 56/12.7, 16.9

[56] References Cited

U.S. PATENT DOCUMENTS

| | | | |
|---|---|---|---|
| Re. 34,815 | 1/1995 | Byrne ............................ | 172/15 |
| D. 339,145 | 9/1993 | Earley, Jr. ...................... | D17/17 |
| 2,075,301 | 3/1937 | Pipenhagen .................... | 30/DIG. 5 |
| 3,028,669 | 4/1962 | Caskey et al. ................. | 30/276 |
| 3,453,732 | 7/1969 | Wilkin .......................... | 30/296.1 |
| 3,959,879 | 6/1976 | Sellers .......................... | 30/276 |
| 4,007,526 | 2/1977 | Langenstein ................... | 30/276 |
| 4,268,964 | 5/1981 | Moore ........................... | 30/276 |
| 4,756,084 | 7/1988 | Morita ........................... | 30/276 |
| 4,756,148 | 7/1988 | Gander et al. ................. | 56/17.2 |
| 4,803,831 | 2/1989 | Carmine ........................ | 56/16.9 |
| 4,890,389 | 1/1990 | Whitkop ........................ | 30/276 |
| 4,894,914 | 1/1990 | Mead ............................ | 30/276 |
| 4,894,916 | 1/1990 | Nimz et al. .................... | 30/298.4 |
| 4,972,586 | 11/1990 | Matsumoto et al. .......... | 30/276 |
| 4,981,012 | 1/1991 | Claborn ......................... | 56/16.9 |
| 5,029,435 | 7/1991 | Buchanan ...................... | 56/12.1 |
| 5,048,187 | 9/1991 | Ryan ............................. | 30/276 |
| 5,060,383 | 10/1991 | Ratkiewich ................... | 30/276 |
| 5,107,665 | 4/1992 | Wright ........................... | 56/12.7 |
| 5,228,276 | 7/1993 | Miller ............................ | 56/12.1 |
| 5,351,762 | 10/1994 | Bean ............................. | 172/17 |
| 5,385,005 | 1/1995 | Ash ............................... | 56/12.7 |
| 5,423,126 | 6/1995 | Byrne ............................ | 30/276 |
| 5,584,348 | 12/1996 | Butler ............................ | 172/13 |

FOREIGN PATENT DOCUMENTS

0 646 311 A1  4/1995  European Pat. Off. .

*Primary Examiner*—Hwei-Siu Payer
*Attorney, Agent, or Firm*—Marshall, O'Toole, Gerstein, Murray & Borun

[57] ABSTRACT

A string trimmer includes a wire guard assembly which retains a wire guard and debris shield on a motor housing. The wire guard is retained in a pair of grooves in the motor housing to capture the debris shield between the wire guard and an upper portion of the motor housing. The wire guard is locked in place by locking members on the bottom of the shield, thereby substantially permanently connecting the shield to the motor housing without the necessity of additional parts.

21 Claims, 7 Drawing Sheets

WIRE GUARD ASSEMBLY FOR A STRING TRIMMER

BACKGROUND OF THE INVENTION

1. Field of the Invention

The present invention relates generally to lawn and garden implements and, more particularly, to a wire guard assembly for a vegetation cutter.

2. Description of the Related Art

Vegetation cutters have long been used to trim vegetation inaccessible to lawn mowers. One type of vegetation cutter is known as a string trimmer, in which one or more flexible flails, typically made of nylon or an extruded plastic, extend outwardly from a cutting head into a cutting plane. A motive power source, typically either an electric motor or a small gasoline engine, rotates the cutting head. While initially used for trimming grass and weeds around trees, shrubs, fences, and the like, string trimmers are now being used for edging of sidewalks and curbs. By adapting the string trimmer to operate as both a grass and weed trimmer and an edger, the need for a conventional rollable rotating blade edger is eliminated and a person can trim around trees and shrubs and edge sidewalks without having to change equipment between operations.

A practical problem in cutting grass and weeds is the damage that occurs when the rotating flexible flails come into contact with objects that the flails were not intended to trim. When this occurs, the flails must be replaced. Additionally, the rotating flails can cause damage to small trees by wearing away the bark of the tree and the leaving the tree trunk exposed and unprotected. Therefore, string trimmers require a guard that will allow the rotating flails to get close enough to do an effective job on grass and weeds, but not so close as to damage a permanent structure or the string trimmer itself.

Another practical problem arises when the string trimmer is used for edging around sidewalks and curbs. Because the flails are rotating at a high speed, the operator has difficulty seeing the planar cutting circle created by the rotating flails. Because of this inability, it is desirable for the guard described above to act also as an edging guide, which allows the rotating flails to cut a uniform edge along a sidewalk or a curb without coming into contact with the sidewalk or the curb.

Various devices that function as both a guard and an edging guide have been proposed for attachment to string trimmers. Many of these devices attach to the string trimmer proximate the cutting head and extend out to or slightly beyond the cutting circle defined by the rotating flails. Further, each of these devices requires attachment components for mounting the device to the string trimmer. These components are in addition to components required for attaching other devices, such as a debris shield, to the trimmer. Examples of devices used as guards and edging guides are shown in U.S. Pat. Nos. 5,107,665; 5,060,383; 4,894,916; and 4,756,084. By requiring a separate set of attachment components, these designs increase the complexity of manufacturing and assembling the string trimmers.

SUMMARY OF THE INVENTION

According to one aspect of the present invention, a guard for a string trimmer includes a first portion for interconnecting a debris shield and a housing of the string trimmer to retain the debris shield on the housing and a second portion coupled to and extending away from the first portion and defining a guide limit.

According to a further aspect of the present invention, a guard for a vegetation cutter having a shield and a housing includes means for securing the shield to the housing and means for defining a guard limit extending at least to an outer edge of a cutting swath.

According to yet another aspect of the present invention, a guard assembly for a string trimmer having a housing including top and bottom portions and a rotating cutting device extending from the bottom portion comprises a shield having top and bottom surfaces, wherein the top surface of the shield abuts the top portion of the housing. A guard engages the housing and the shield, thereby securing the shield to the housing.

The features and advantages of the invention will be apparent to those of ordinary skill in the art in view of the detailed description of the preferred embodiment, which is made with reference to the drawings, a brief description of which is provided below.

DETAILED DESCRIPTION OF THE PREFERRED EMBODIMENTS

Figure 1:
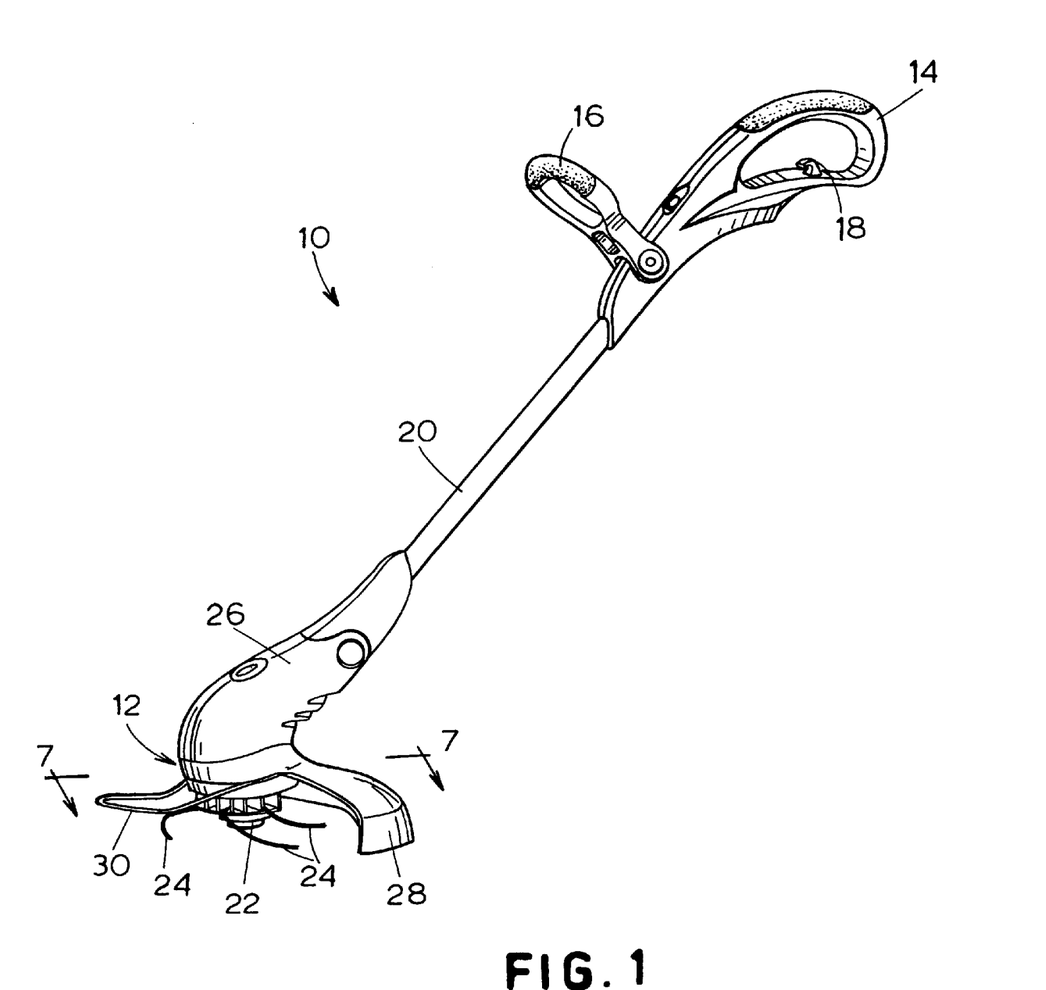
FIG. 1 is a perspective view of a string trimmer having a wire guard assembly according to the present invention.

FIG. 1 shows a string trimmer 10 having a wire guard assembly 12 in accordance with the present invention. Except for the wire guard assembly 12, the string trimmer 10 may be conventional. The guard assembly 12 can be used with various different cutting devices, and the string trimmer 10 is purely exemplary.

The string trimmer 10 has an upper portion which includes an upper or main handle 14 and an auxiliary handle 16 which are grasped by the operator to control the movement of the string trimmer 10. The upper handle 14 further includes a trigger 18 which is manipulated to actuate the string trimmer 10.

The upper portion of the string trimmer 10 is connected by a boom 20 to a lower portion which includes a motor housing 26, a debris shield 28, a wire guard 30 and a cutting head 22 having one or more flails 24. An electric motor (not shown) is mounted in the motor housing 26 and a power cord extends from the upper handle 14 through the boom 20 to the electric motor. When a gasoline engine is used to power the string trimmer 10, the engine may be mounted above the upper handle 14 with a rotatable drive cable extending through the boom 20 to the cutting head 22.

During operation of the string trimmer 10, the operator grasps upper handle 14 and auxiliary handle 16 and activates the string trimmer 10 via the trigger 18. The electric motor causes the cutting head 22 and the flails 24 to rotate rapidly about a vertical axis. The lower portion of the string trimmer 10 is directed towards the vegetation to be cut by the operator. As the flails 24 cut the grass and weeds, the debris shield 28 prevents the trimmed vegetation and other objects from being ejected in the direction of the operator. The wire guard 30 extends to the edge of or slightly beyond a cutting swath defined by the rotating flails 24. The wire guard 30 prevents the head 22 and flails from moving closer than a predetermined distance to stationary objects, such as walls, fence posts, and tree trunks, to prevent damage to the flails 24 and/or the objects.

When the string trimmer 10 is used as an edger along a sidewalk, the lower portion of the string trimmer 10 and the boom are rotated about an axis of the boom 20 relative to the upper handle 14 to orient the cutting head 22 and the flails 24 to create a vertical cutting circle. In the edging orientation, the debris shield 28 still operates to prevent the flails 24 from ejecting objects in the direction of the operator. The wire guard 30 guides the string trimmer 10 along the edge of the sidewalk, thereby causing the string trimmer 10 to cut a uniform edge along the sidewalk without damaging the rotating flails 24.

Figure 2:
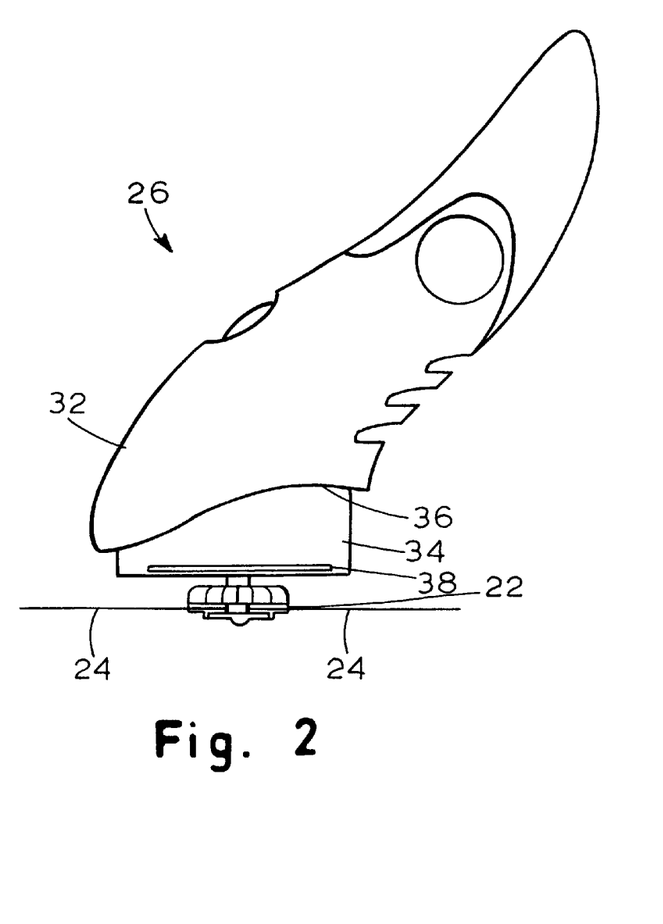
FIG. 2 is a side elevational view of the motor housing of FIG. 1 with the debris shield and wire guard assembly removed therefrom.

FIG. 2 illustrates the motor housing 26 adapted for use in the wire guard assembly 12 according to the present invention. The motor housing 26 has an upper portion 32 and a lower portion 34 having a slightly smaller cross-sectional dimension than the upper portion 32, thereby creating a ridge 36 between the upper portion 32 and the lower portion 34. The cutting head 22 extends downwardly from the bottom of the lower portion 34. A pair of grooves 38 are formed in the outer surface of the lower portion 34, which grooves will receive the wire guard 30 during assembly of the wire guard assembly 12 in a manner further described herein.

Figure 3:
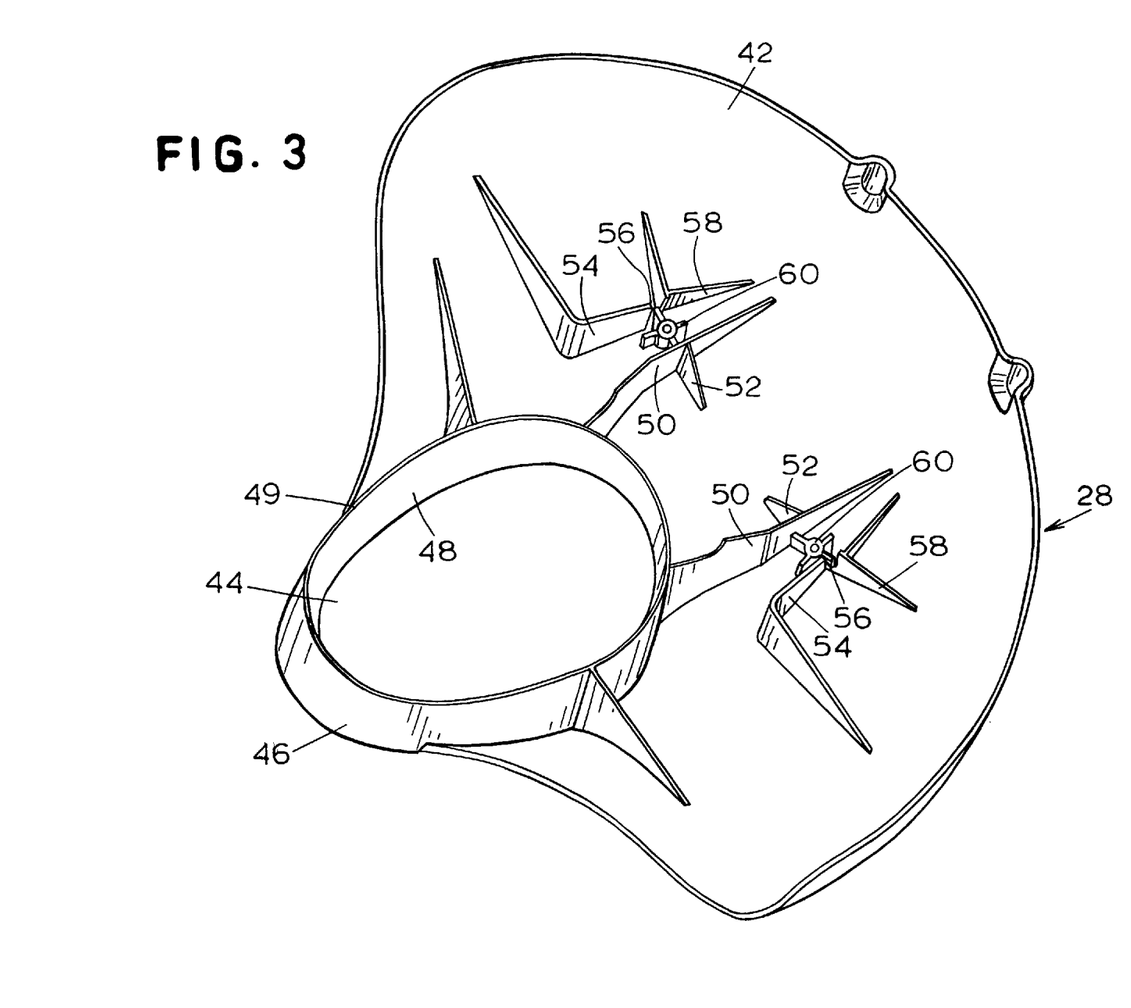
FIG. 3 is a perspective view of the bottom of the debris shield of the trimmer shown in FIG. 1.

The bottom surface of the debris shield 28 is shown in FIG. 3. The debris shield 28 includes an apron 42 and an opening 44 which allows insertion of the lower portion 34 of the motor housing 26 therethrough. A collar 46 having a top rim 48 and a bottom rim 49 is integrally connected to the apron 42 and surrounds the opening 44. The debris shield 28 further includes a pair of support members in the form of ribs 50 integrally connected to the apron 42 and connected to and extending away from the collar 46. The support ribs 50 include lateral support members or ribs 52 which prevent lateral deflection of the support members or ribs 50. Two locking members or ribs 54 located proximate to each of the support ribs 50 are integrally connected to the apron 42, thereby forming with the support ribs 50 a pair of tapered channels, which narrow as the support ribs 50 and the locking ribs 54 extend away from the collar 46. Unlike the support ribs 50, the locking ribs 54 do not have lateral support and thus are able to deflect laterally when a force is applied to the locking ribs 54 proximate locking surfaces 56. The debris shield 28 further includes a pair of backstop members 58 and a pair of optional posts 60 located proximate each of the locking surfaces 56 of the locking ribs 54 and integrally connected to the apron 42. The support ribs 50, locking ribs 54, and backstop members 58 engage the wire guard 30 as discussed below to substantially permanently attach the debris shield 28 to the motor housing 26.

Figure 4:
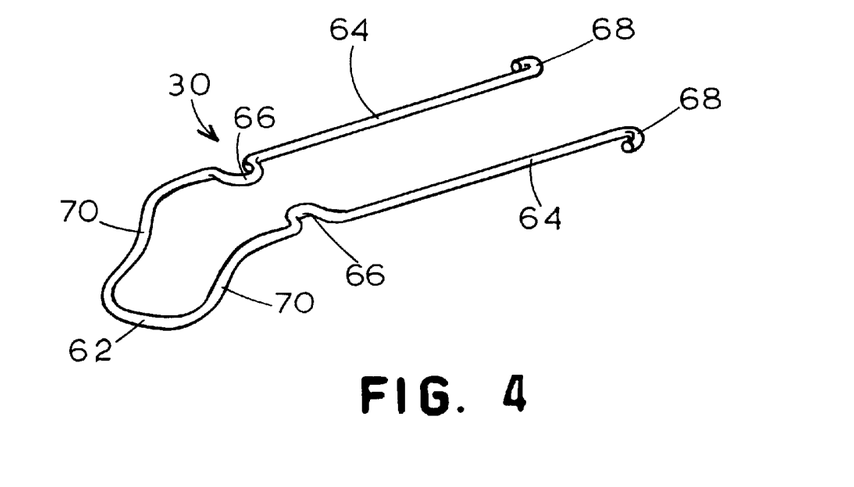
FIG. 4 is an isometric view of a wire guard.

FIG. 4 illustrates the wire guard 30 according to the present invention. The wire guard 30 is formed from a single piece of metallic wire and includes a curved front section 62 and a pair of legs 64 extending rearwardly from the curved front section 62. Between each leg 64 and the curved front section 62 are a series of bends which form a pair of U-shaped knuckles 66 in the wire guard 30. Each leg 64 further includes a hook 68 at an end opposite the curved front section 62. A pair of bent sections 70 are disposed proximate the curved front section 62 so as to place the curved front section 62 into proper alignment with the cutting head 22 and the flails 24.

Figure 5:
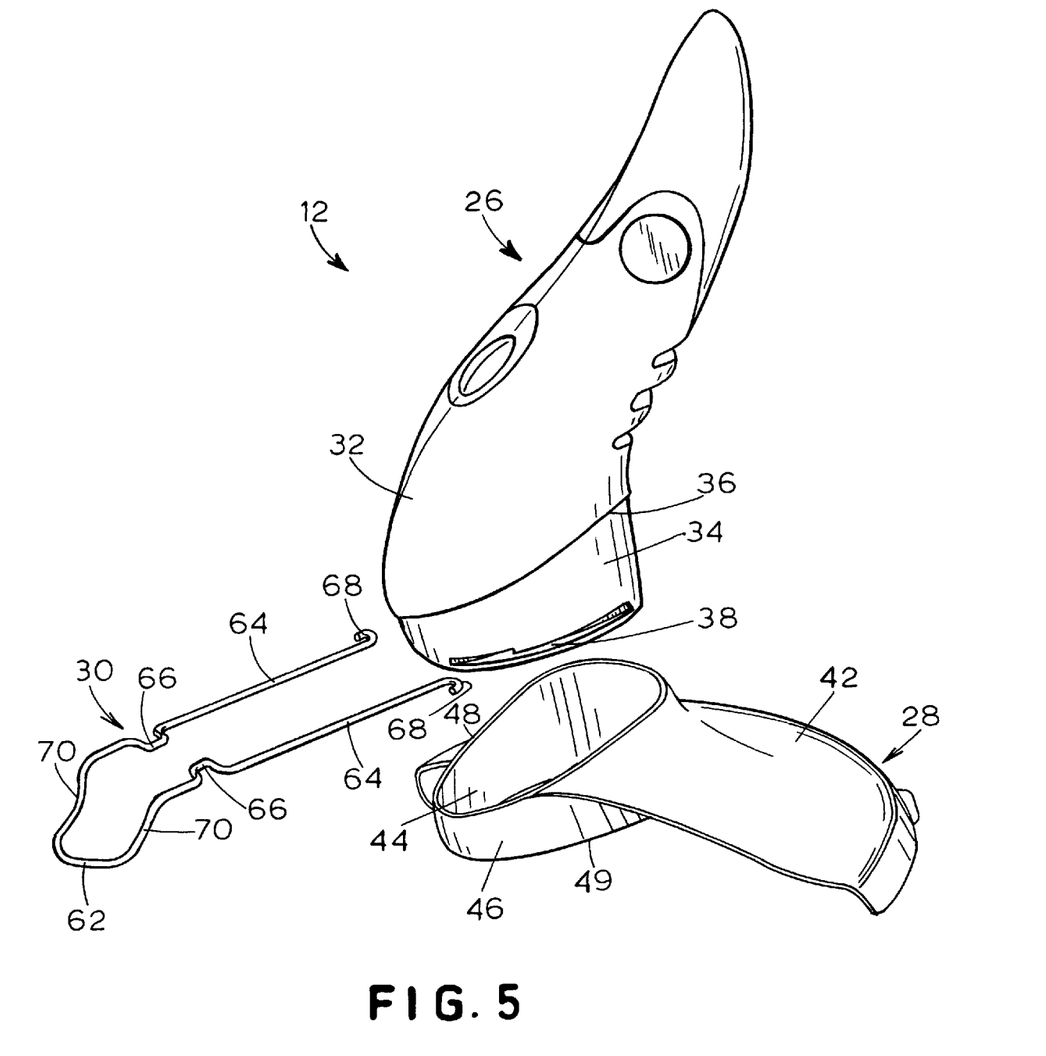
FIG. 5 is an exploded isometric view of the wire guard assembly, debris shield and motor housing.
Figure 6:
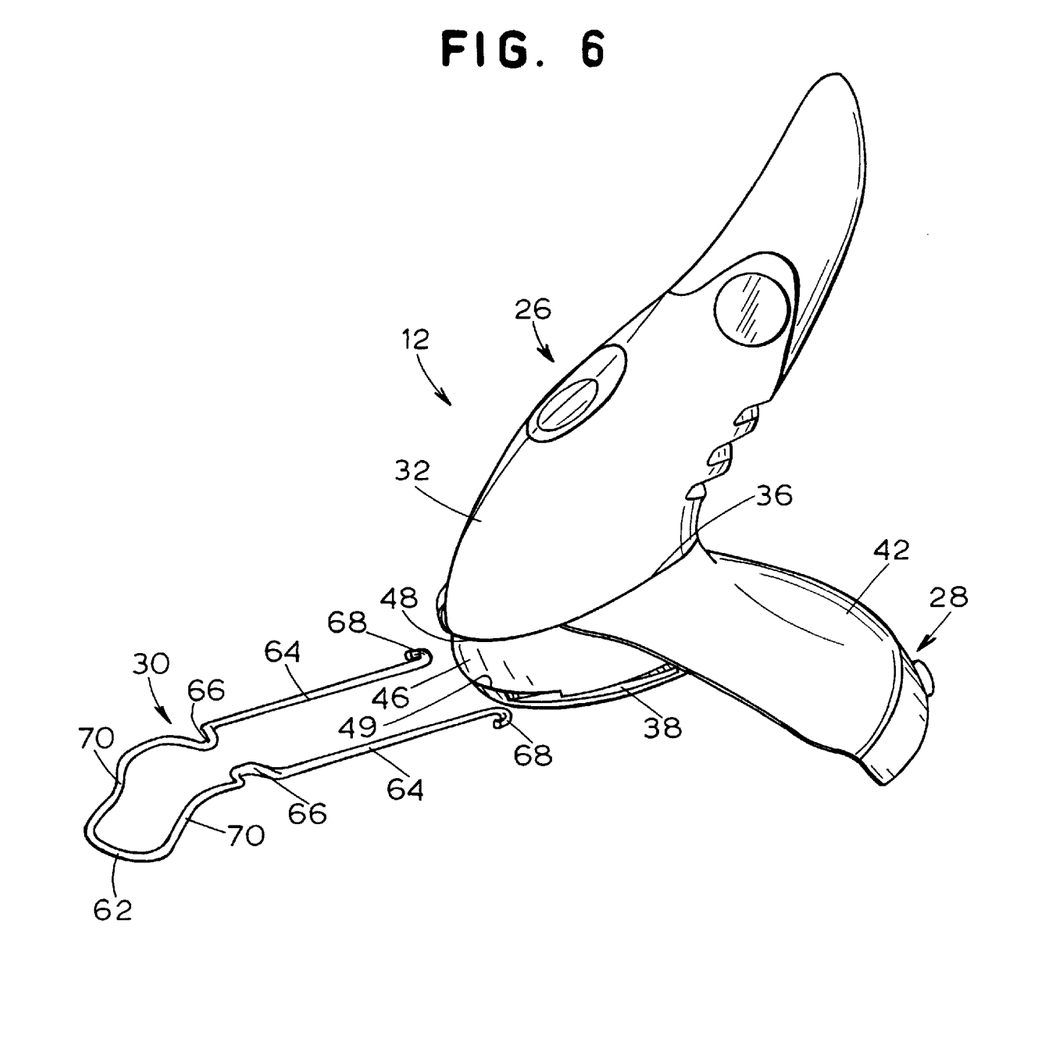
FIG. 6 is a partially exploded view of the components of FIG. 5 with the debris shield installed on the motor housing.
Figure 7:
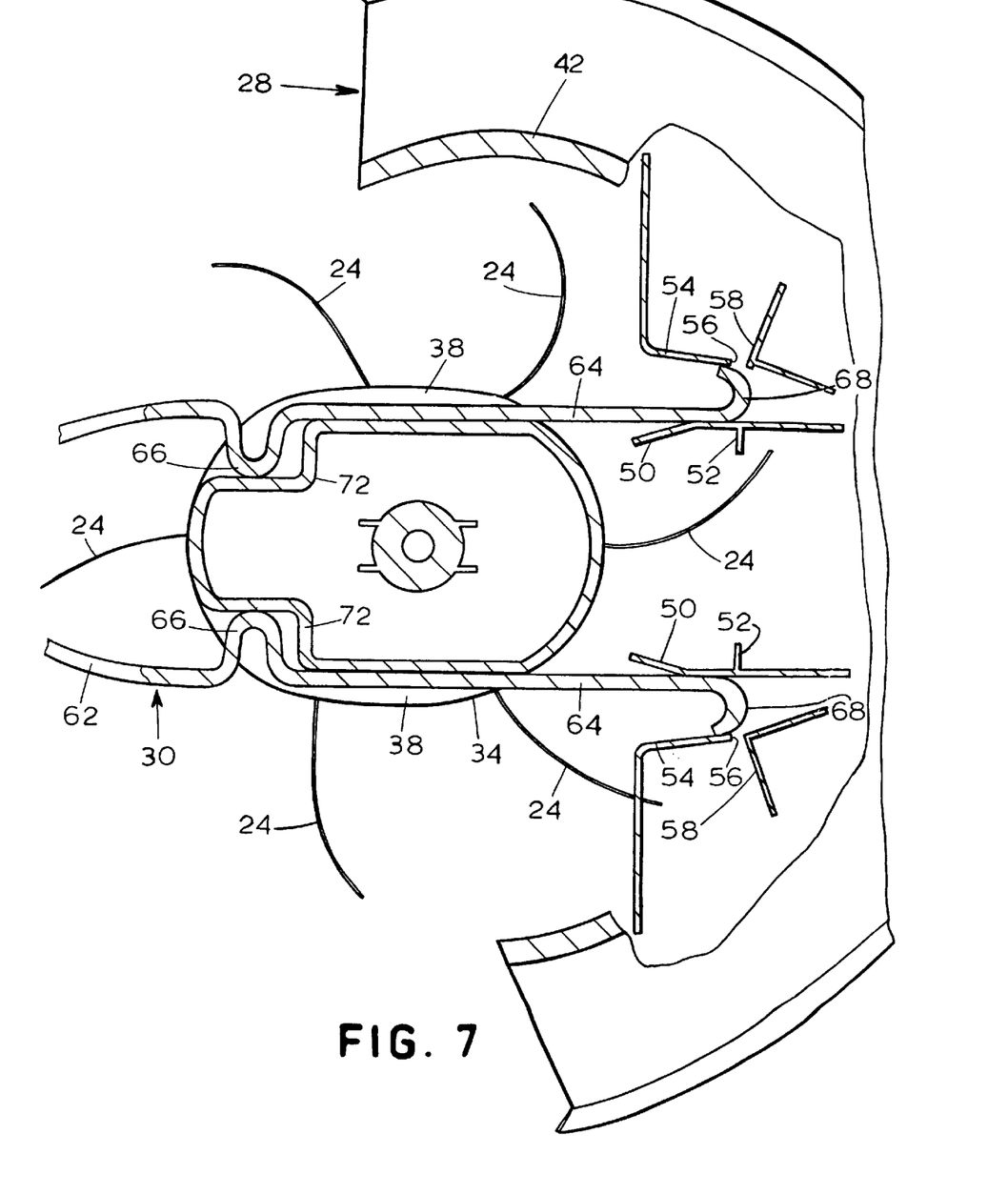
FIG. 7 is a sectional view from above taken generally along the lines 7—7 of FIG. 1 and showing the wire guard of FIG. 4 in intermediate engagement with the motor housing and the debris shield.

FIGS. 5–8 illustrate the process for assembling the wire guard assembly 12. FIG. 5 illustrates an exploded view of the wire guard assembly 12 with the motor housing 26, the debris shield 28, and the wire guard 30 in proper alignment for assembly. The cutting head 22 and flails 24 are omitted from FIGS. 5 and 6 for clarity. First, the lower portion 34 of the motor housing 26 is inserted through the opening 44 of the debris shield 28 until the ridge 36 abuts the top rim 48 (FIG. 6). At this point, the grooves 38 of the motor housing 26 extend below the bottom rim 49 of the collar 46 thereby leaving the grooves 38 free to receive the legs 64 of the wire guard 30. The legs 64 of the wire guard 30 then are slid through the grooves 38 until the hooks 68 enter the tapered channels and engage the support ribs 50 and the locking ribs 54 as shown in FIG. 7. As the legs 64 slide farther through the groove 38, the support ribs 50 remain substantially fixed as the hooks 68 cause the locking ribs 54 to deflect laterally, thereby allowing the hooks 68 to pass beyond the locking surfaces 56.

Figure 8:
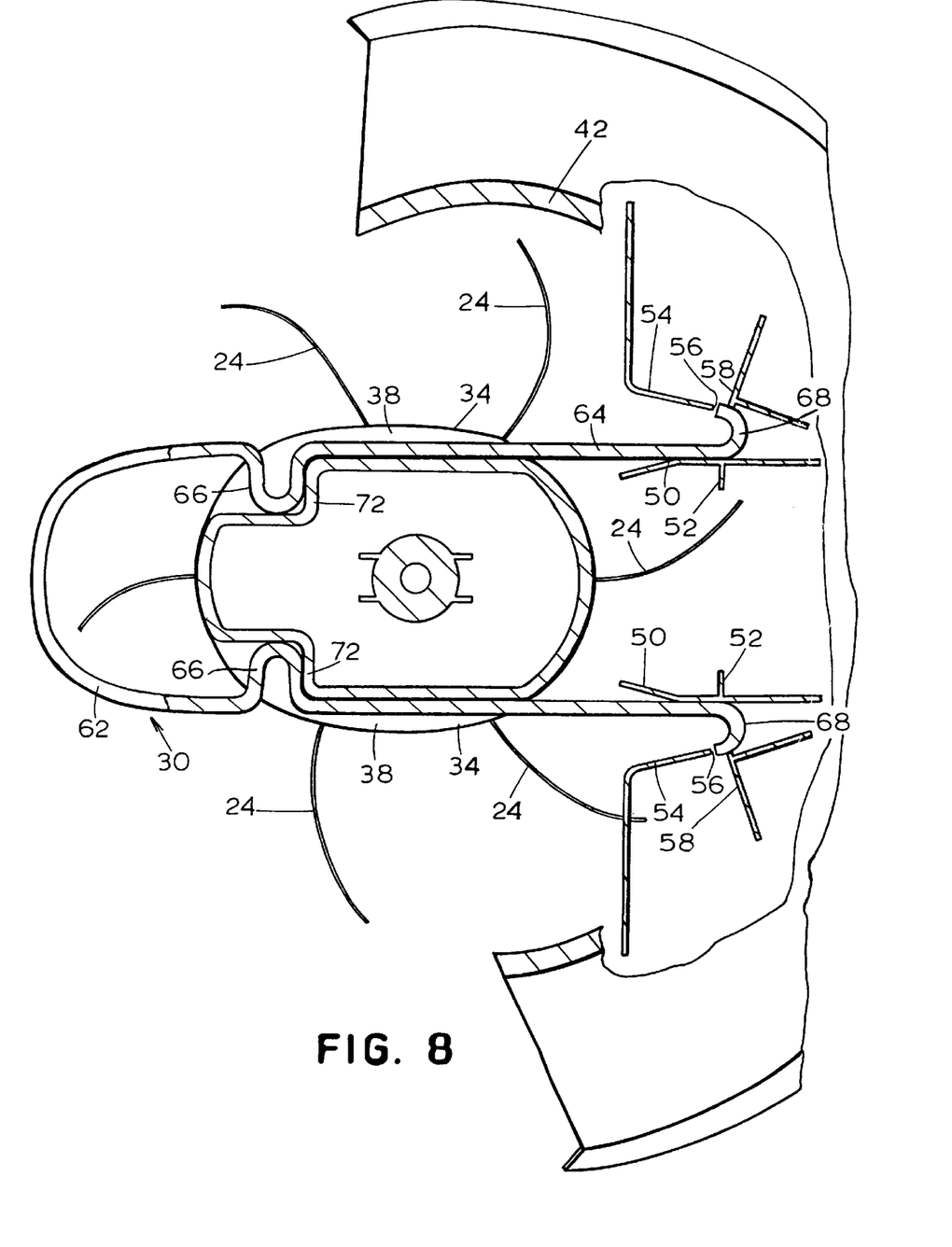
FIG. 8 is a sectional view similar to FIG. 7 showing the wire guard in full engagement with the motor housing and the debris shield.

Once the hooks 68 pass beyond the locking surfaces 56, as shown in FIG. 8, the wire guard assembly 12 is substantially permanently locked in place. At this point, the locking ribs 54 return to their initial position, thereby placing the locking surfaces 56 in interfering relationship with the hooks 68. The legs 64 then are prevented from sliding back through the groove 38 owing to engagement of the locking surfaces 56 with the hooks 68. Also at this time the curved front section 62 of the wire guard 30 is properly positioned proximate the outer edge of the cutting circle by the backstop members 58 and by a pair of shoulders 72 each located within one of the grooves 38. After the hooks 68 slide past the locking surfaces 56, the hooks 68 engage the backstop members 58, thereby preventing further insertion of the wire guard 30. Additionally, the shoulders 72 in the grooves 38 engage the U-shaped knuckles 66 of the wire guard 30 to prevent further sliding of the legs 64 through the grooves 38. Therefore, once the hooks 68 pass the locking surfaces 56, the wire guard 30 is substantially fixed within the grooves 38 of the motor housing 26.

Once the wire guard 30 is installed on the motor housing 26 and the debris shield 28 as described above, the wire guard assembly 12 is substantially permanently attached to the string trimmer 10. The wire guard 30 is locked into place by the locking surfaces 56 and the hooks 68. In this position, the wire guard 30 simultaneously engages the bottom of the grooves 38 and the bottom rim 49 of the collar 46. The debris shield 28 thus is captured between the wire guard 30 and the lip 36 to prevent removal of the shield from the motor housing 26. In this manner, the debris shield 28 and the wire guard 30 both are attached to the string trimmer 10 by a single attachment mechanism consisting only of functional components of the string trimmer 10. In so doing, the present invention provides a string trimmer 10 with fewer manufactured parts and with a substantially less complex assembly process.

In addition, because the debris shield 28 is secured to the motor housing 26 by the wire guard 30, a user cannot attempt to use the string trimmer with the debris shield 28 alone (i.e., without the wire guard 30). Operator safety thus is enhanced.

In an alternative embodiment of the guard assembly 12, the lateral support ribs 52 are integral components of the locking ribs 54, rather than of the support ribs 50, and prevent substantial lateral deflection of the locking ribs 54. In this embodiment, the support ribs 50, rather than the locking ribs 54, are deflected laterally when engaged by the hooks 68 during assembly.

While the present invention has been described with reference to the specific examples, which are intended to be illustrative only and not to be limiting on the invention, it will be apparent to those of ordinary skill in the art that changes, additions, and/or deletion may be made to the disclosed embodiment without departing from the spirit and scope of the invention.

What is claimed is:

1. A vegetation cutter including a housing having top and bottom portions and a rotating cutting device extending from the bottom portion, wherein the rotating cutting device defines a planar cutting circle, comprising:

a shield having top and bottom surfaces, wherein the top surface of the shield abuts the top portion of the housing; and a guard engaging the housing and the shield, thereby securing the shield to the housing.

2. The vegetation cutter of claim 1, wherein the bottom portion of the housing further comprises a pair of grooves and the guard further comprises a pair of legs each adapted to engage one of the grooves and the bottom surface of the shield.

3. The vegetation cutter of claim 2, wherein the bottom surface of the shield further comprises a pair of locking members and the guard further comprises end portions on each of the legs, each locking member being adapted to interferingly engage one of the end portions when the legs engage the grooves, wherein the guard is adapted to be substantially permanently attached to the housing and the shield when the legs engage the grooves and the locking members engage the end portions.

4. The vegetation cutter of claim 3, wherein the legs slidably engage the grooves and the locking members are adapted to allow the legs to slide in the grooves in a first direction and to engage the end portions, thereby preventing the legs from sliding in the grooves in a second direction.

5. The vegetation cutter of claim 4, wherein a portion of the guard extends at least to an outer limit of the planar cutting circle.

6. The vegetation cutter of claim 1, wherein the guard is formed from a single continuous piece of metal material.

7. The vegetation cutter of claim 1, wherein the guard is adapted to guide the rotating cutting device when the vegetation cutter is used as an edger.

8. A vegetation cutter, comprising:

a rotatable flail;

a shield;

a housing;

a guard including means for securing the housing to the shield; and the guard further including means for defining a guard limit extending at least to an outer edge of a cutting swath defined by the flail.

9. The vegetation cutter of claim 8, wherein the securing means comprises a pair of legs and the housing includes a bottom portion having a pair of grooves, each leg being adapted to engage one of the grooves and a bottom surface of the shield.

10. The vegetation cutter of claim 9, wherein each leg includes an end portion, each end portion being adapted to engage a locking member on the bottom surface of the shield, whereby the guard is substantially permanently attached to the housing and the shield when the legs engage the grooves and the end portions engage the locking members.

11. The vegetation cutter of claim 10, wherein the legs slidably engage the grooves during installation and the locking members are adapted to allow the legs to slide in the grooves in a first direction and to engage the end portions, thereby substantially preventing the legs from sliding in the grooves in a second direction.

12. The vegetation cutter of claim 8, wherein the guard is fabricated from a single continuous piece of metal material.

13. The vegetation cutter of claim 8, wherein the guard is adapted to guide the vegetation cutter when the vegetation cutter is used as an edger.

14. A guard for a vegetation cutter, comprising:

a first portion adapted to interconnect a shield and a housing of the vegetation cutter to retain the shield on the housing; and a second portion coupled to and extending away from the first portion and defining a guard limit.

15. The guard of claim 14, wherein the first portion includes a first section for placement between the housing and the shield and a second section for interfering engagement with a locking member carried by the shield.

16. The guard of claim 15, wherein the second section comprises a hooked portion.

17. The guard of claim 14, wherein the first portion includes first and second legs each having a first section for placement between the housing and the shield and a second section for interfering engagement with a locking member carried by the shield.

18. The guard of claim 17, wherein each second section comprises a hooked portion.

19. The guard of claim 14, wherein the second portion includes a curved front section.

20. The guard of claim 14, wherein the guard is fabricated of a single piece of metal material.

21. The guard of claim 14, wherein the guard is adapted to guide the vegetation cutter when the vegetation cutter is used as an edger.

* * * * *